United States Patent

Maei

Patent Number: 5,166,975
Date of Patent: Nov. 24, 1992

[54] COMMUNICATION TERMINAL EQUIPMENT

[75] Inventor: Yoshihiro Maei, Iwatsuki, Japan

[73] Assignee: Fuji Xerox Co., Ltd., Tokyo, Japan

[21] Appl. No.: 740,845

[22] Filed: Aug. 6, 1991

[30] Foreign Application Priority Data

Aug. 9, 1990 [JP] Japan ................................ 2-211003

[51] Int. Cl.$^5$ ..................... H04M 11/00; H04M 3/42; H04J 3/12
[52] U.S. Cl. ...................................... 379/93; 379/100; 379/209; 370/110.1
[58] Field of Search ........................ 379/93, 94, 96, 97, 379/98, 100, 209, 221, 207; 370/110.1, 94.1, 94.2, 60, 60.1

[56] References Cited

U.S. PATENT DOCUMENTS

| | | | |
|---|---|---|---|
| 5,034,948 | 7/1991 | Mizutani et al. | 379/93 |
| 5,062,108 | 10/1991 | Bales et al. | 370/110.1 |

FOREIGN PATENT DOCUMENTS

| | | | |
|---|---|---|---|
| 0337610 | 10/1989 | European Pat. Off. | 379/100 |
| 0153951 | 6/1988 | Japan | 379/209 |
| 0248268 | 10/1988 | Japan | 379/209 |

*Primary Examiner*—James L. Dwyer
*Assistant Examiner*—Jason Chan
*Attorney, Agent, or Firm*—Finnegan, Henderson, Farabow, Garrett and Dunner

[57] ABSTRACT

A communication terminal equipment that permits two-way communications to be performed over a complex communications network having an integrated services digital network interconnected with existing multiple communication networks and that has a capability for calling again a receiver terminal of interest when a communication trouble has occurred. The repeated call management table selecting unit selects a repeated call management table that complies with a specific conditions of calling a receiver terminal of interest. If a communication trouble occurs during the calling operation to permit disconnect information to be sent back, the repeated call condition selecting units selects the appropriate condition for making a repeated call from the repeated call management table in response to the returned disconnect information. The selected condition for making a repeated call corresponds to the disconnect information positively, thereby enabling a repeated call to be made in a reliable manner.

2 Claims, 6 Drawing Sheets

| DISCONNECT INFORMATION | REPEATED CALL PARAMETER |
|---|---|
| 0 | $a_1$ |
| 1 | $a_2$ |
| 2 | $a_3$ |
| ⋮ | ⋮ |
| 225 | $a_n$ |

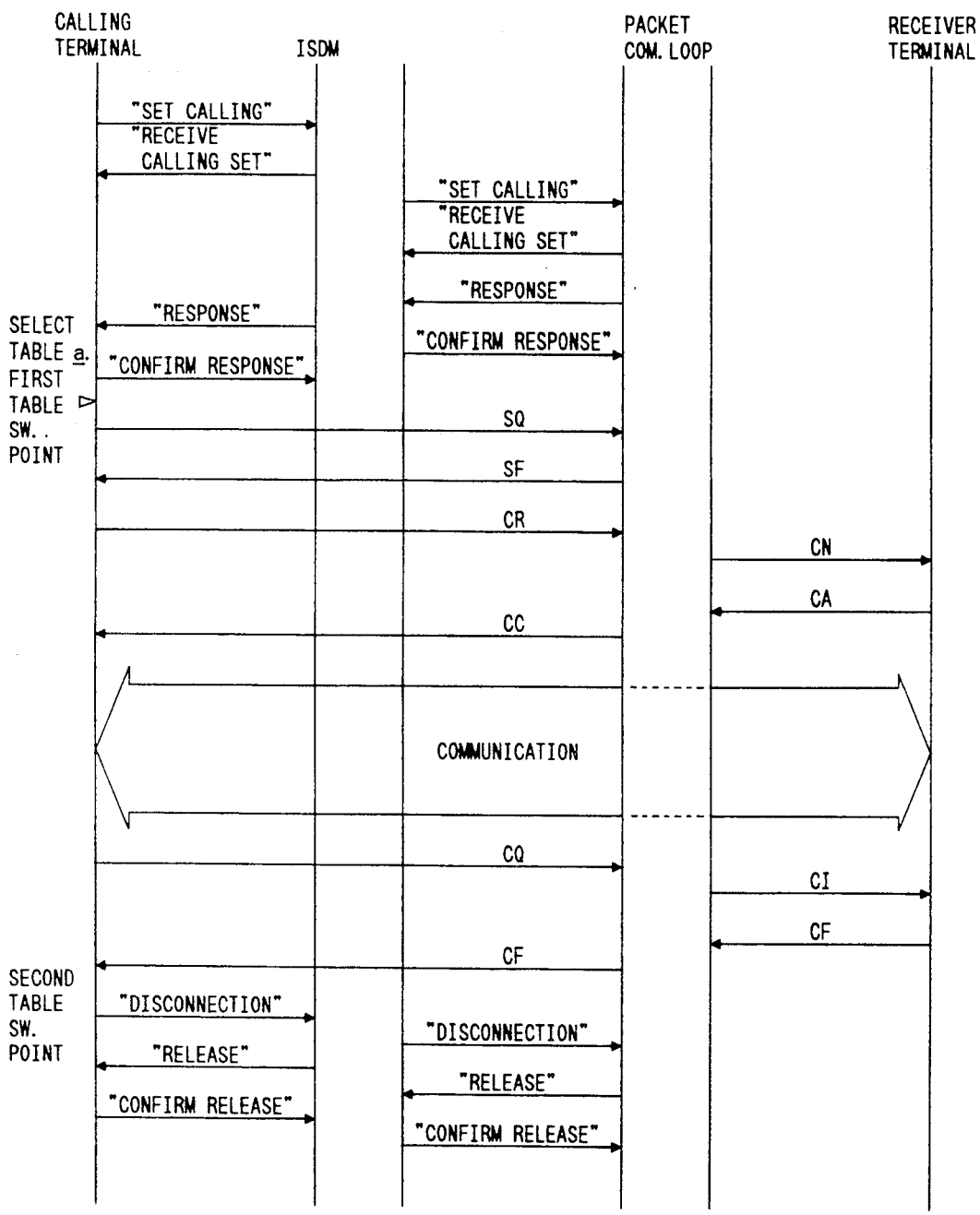
FIG. 6 NORMAL COMMUNICATION (CASE A)
SQ : RESTART REQUEST PACKET
SF : RESTART CONFIRMATION PACKET
CR : CALLING REQUEST PACKET
CN : RECEIVING INSTRUCTION PACKET
CA : RECEIVING RESPONSE PACKET
CC : CALLING CONFIRMATION PACKET
CQ : DISCONNECTION REQUEST PACKET
CI : DISCONNECTION INSTRUCTION PACKET
CF : DISCONNECTION CONFIRMATION PACKET

COMMUNICATION TERMINAL EQUIPMENT

BACKGROUND OF THE INVENTION

This invention relates to communication terminal equipment to be connected to an integrated services digital network. More particularly, this invention relates to communication terminal equipment that permits two-way communications to be performed over a complex communications network having an integrated services digital network interconnected with existing multiple communication networks and that has a capability for calling again a receiver terminal of interest when a communication trouble has occurred.

Facsimile and other types of communication terminal equipment have chiefly been connected to telephone networks and packet-switched public data networks (hereinafter abbreviated as "PSPDN"). In recent years, such communication terminal equipment is increasingly connected to an integrated services digital network which is adapted to handle digital information (which network is hereinafter abbreviated as "ISDN").

The ISDN concept refers to a communications network in which various kinds of communication machines such as telephones, facsimile equipment and telexes that are connected to data service units (DSU) through buses are designed to handle information in a standardized digital format, with all communication services to those communication machines for a particular DSU being implemented with the same number.

Various communication troubles can occur in telephone networks, PSPDNs and ISDNs as exemplified by the failure to connect a source terminal and a receiver terminal, as well as a disconnected line that occurs during communications. If a certain communication trouble occurs, disconnect information as appropriate for the situation under which the trouble has occurred is sent back to the source terminal. Each terminal equipment is provided with a repeated call management table which is descriptive of the unique correlation between disconnect information and the condition for making a repeated call. Upon receiving a certain type of disconnect information, the terminal equipment refers to that table on the basis of the received disconnect information and makes a repeated attempt to call the receiver terminal under the condition that is appropriate for that disconnect information.

Since the contents of disconnect information differ from one communications network to another, the repeated call management table in each terminal equipment also depends on which communications network it is connected to. For example, the terminal equipment connected to a PSPDN has a repeated call management table a, the terminal equipment connect to a telephone network has a repeated call management table b, and the terminal equipment connected to an ISDN has a repeated call management table c. Thus, each terminal equipment has had a single kind of repeated call management table in accordance with the communications network to which it is connected.

In the early stage of ISDN introduction, an important objective is to establish efficient interconnection between the ISDN and other existing networks. Particularly crucial is the interconnection with telephone networks and PSPDNs which are two most common communication networks.

FIG. 2 shows the basic layout for Case A which has been specified by the CCITT as regards the interconnection between ISDNs and PSPDNs. The term "Case A" as used herein means one from of services to a PSPDN that is connected to an ISDN. As shown in FIG. 2, the ISDN does not have a packet switching capability in Case A and functions only as a physical subscriber loop between a packet terminal 20 connected to the ISDN and a packet switching unit in the PSPDN. If the ISDN packet terminal 20 requests a packet-mode communication via a D-channel, the ISDN switching unit sets up a 64 kb/s unrestricted digital path between the packet terminal 20 and an ISDN access unit board (AU). As a result, a subscriber loop is completed between the ISDN packet terminal 20 and the PSPDN and, thereafter, call control from the packet terminal 20 will be performed by a procedure that is entirely the same as in the call control from the terminal directly accommodated in the PSPDN.

In the above-described configuration of Case A, the communications network to be handled is the ISDN until the packet terminal 20 is connected to the AU, so network control is performed in accordance with the procedure of ISDN call control. However, when a communication line is set up between the packet terminal 20 and the AU, the communications network to be handled is switched to the PSPDN and subsequent call control is performed in accordance with the procedure specified by CCITT's Recommendation X.25. Therefore, it a communication trouble occurs in the ISDN procedure which is followed until the packet terminal is connected to the AU, the disconnect information specified by the ISDN call control procedure is sent back and, if a communication trouble occurs in the procedure of Recommendation X.25, the disconnect information specified by the X.25 call control procedure is sent back. In the former case, the repeated call management table c must be referenced and in the latter case, the repeated call management table a must be referenced.

In fact, however, the communication terminal 20 has only the repeated call management table c and is unable to deal with the second type of disconnect information in a satisfactory manner. In short, each of the communication terminals used in the prior art communications system is equipped with only a single kind of repeated call management table, so if different types of disconnect information are sent back for different communication networks, repeated calls cannot be controlled in normal way.

SUMMARY OF THE INVENTION

The present invention has been achieved under these circumstances and has as an object providing communication terminal equipment which, irrespective of the kind of communications network to be handled, insures that a repeated attempt to call a receiver terminal of interest is made positively in response to the disconnect information that is sent back when a communication trouble has occurred.

This object of the present invention can be attained by communication terminal equipment that performs two-way communications with terminal equipment on a complex communications network that comprises an ISND interconnected with existing communication networks, which communication terminal equipment comprises: a calling unit that calls a receiver terminal by the call control procedure and under the condition of communications that comply with a specific calling condition; a call control procedure changing unit that changes the call control procedure upon detecting the switch from one communications network to another to be handled; a disconnect information detecting unit that detects the disconnect information being sent back when a communication trouble has occurred; a repeated call management table storage unit that registers a plurality of repeated call management tables each specifying the relationship between disconnect information and the condition of making a repeated call; a repeated call management table selecting unit by which a repeated call management table that complies with the call control procedure is selected from the repeated call management table storage unit; a repeated calling condition selector unit by which an appropriate condition for making a repeated call is selected from the selected repeated call management table on the basis of the returned disconnect information; and a repeated calling unit that calls again the receiver terminal of interest by the call control procedure and under the condition of communications that comply with the selected condition for making a repeated call.

In the system configuration described above, the repeated call management table selecting unit selects a repeated call management table that complies with a specific conditions of calling a receiver terminal of interest. If a communication trouble occurs during the calling operation to permit disconnect information to be sent back, the repeated call condition selecting unit selects the appropriate condition for making a repeated call from the repeated call management table in response to the returned disconnect information. The selected condition for making a repeated call corresponds to the disconnect information positively, thereby enabling a repeated call to be made in a reliable manner.

BRIEF DESCRIPTION OF THE DRAWINGS

In the accompanying drawings:

FIG. 6 is a schematic diagram showing an example of a sequence in a normal communication procedure;

DESCRIPTION OF THE PREFERRED EMBODIMENTS

Figure 1:
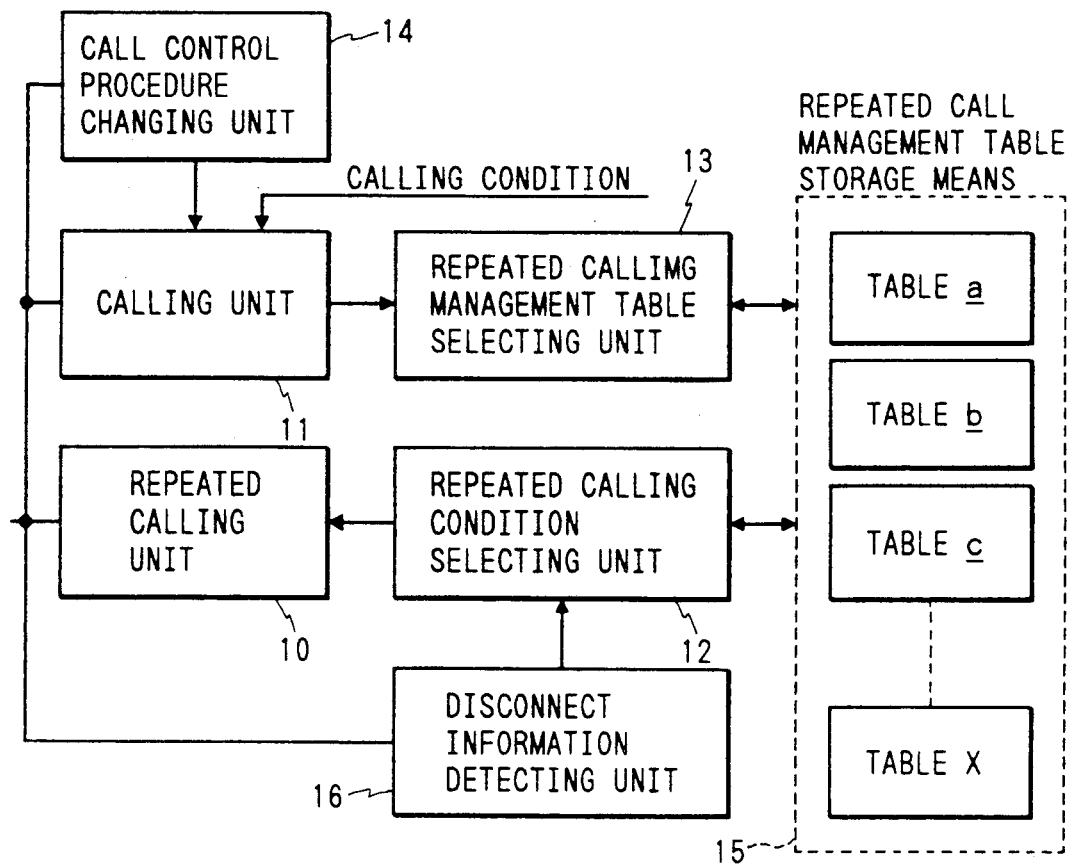
FIG. 1 is a functional block diagram for the communication terminal equipment of the present invention.

FIG. 1 is a functional block diagram for the communication terminal equipment of the present invention. When specific calling conditions such as the subscriber's number of the receiver terminal of interest and the condition of communications are entered, a calling unit 11 determines the call control procedure for calling on the basis of the input calling conditions and calls the receiver terminal in accordance with the thus determined call control procedure.

When the communications network to be handled is switched from one kind to another during the calling operation, a call control procedure changing unit 14 detects that event and changes the call control procedure that has been determined by the calling unit 11. A plurality of repeated call management tables are registered in a repeated call management table storage unit 15.

Figures 3, 5:
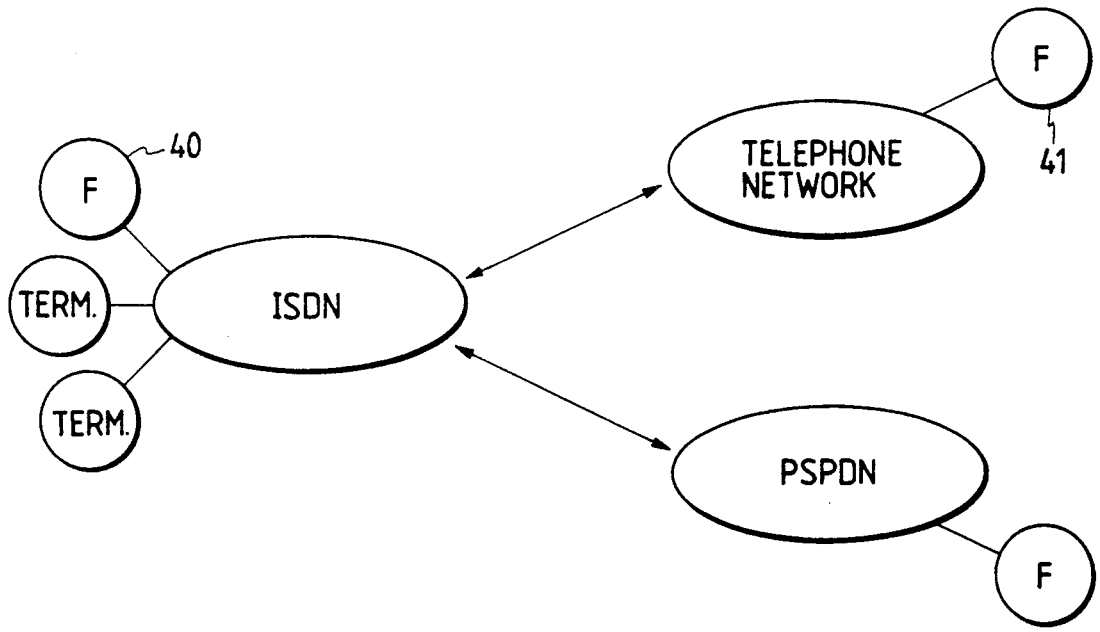
FIG. 3 is a diagram showing an example of the composition of a repeated call management table.
FIG. 5 is a diagram showing a complex communications network in which an ISDn is interconnected with a telephone network and a PSPDN.

FIG. 3 is a diagram sowing an example of the composition of a repeated call management table. Each of the repeated call management tables registered in the storage unit 15 is composed of various kinds of disconnect information and associated parameters for repeated calling. This disconnect information contains values that correspond to CPS values, cause codes, reason indicating values and other data that are sent back, the communications network in which a communication trouble has occurred. The repeated call parameters are identifiers that help specify the conditions of making repeated calls as exemplified by the call control procedure for making a repeated call and the relevant condition of communications.

In accordance with the call procedure determined by the calling unit 11, a repeated call management table selecting unit 13 selects an appropriate repeated call management table from the repeated call management table storage unit 15. A disconnect information detecting unit 16 detects the disconnect information that is sent back from the communications network in which a communication trouble has occurred.

On the basis of the returned disconnect information, a repeated calling condition selector unit 12 selects the appropriate repeated call parameter from the selected repeated call management table. For example, if the contents of the selected repeated call management table are as shown in FIG. 3 and if the returned disconnect information is "0", "$a_1$" is selected as the repeated call parameter.

On the basis of the repeated call parameter selected by the repeated calling condition selector unit 12, a repeated calling unit 10 determines the conditions of making a repeated call including the ball control procedure for repeated calling and the associated condition of communications and calls the receiver terminal again under the thus determined conditions of repeated calling.

Figure 2:
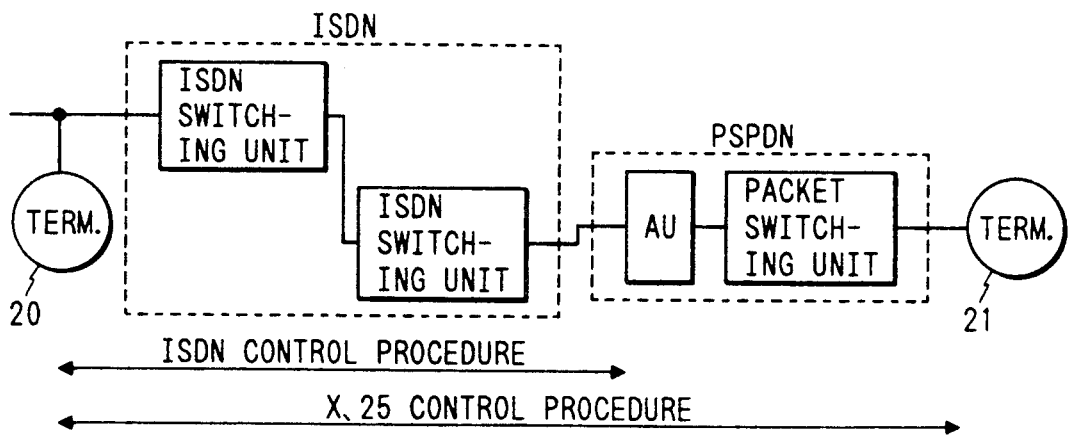
FIG. 2 is a diagram showing the basic configuration of Case A as specified by the CCITT.

When the operator makes a call request in the system configuration described above, the calling unit 11 determines the necessary call control procedure on the basis of the specific calling conditions. The type of the call control procedure is determined in accordance with the party to be called and the condition of communications. For example, if the call request of interest is directed to the terminal 21 shown in FIG. 2, the services to be rendered by Case A are selected and the ISDN call control procedure is first selected in order to set up a communications loop between the PSPDN and the AU that are also shown in FIG. 2.

Figure 7:
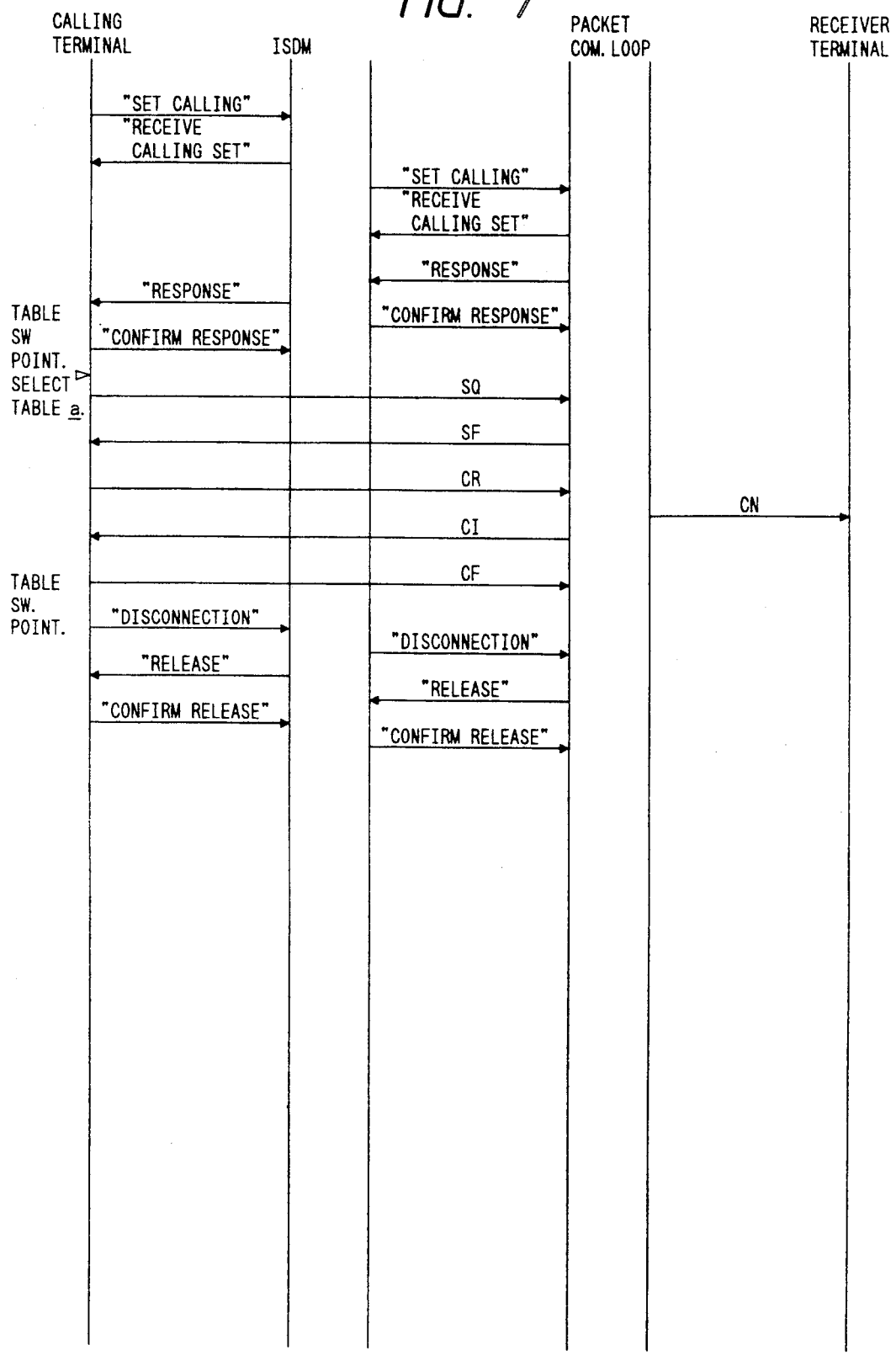
FIG. 7 is a schematic diagram showing an example of a sequence in a communication procedure in which a trouble occurs in the receiver terminal of a PSPDN.

FIG. 6 is a schematic diagram showing an example of a sequence in a normal communication procedure (Case A) whereas FIG. 7 is a schematic diagram showing an example of a sequence in a fault communication procedure in which no response occurs in the receiver terminal of the PSPDN.

If the call control procedure is selected in the ISDN, in response to the selected call control procedure, the repeated call management table selecting unit 13 selects an appropriate repeated call management table, say, table c from the repeated call management table storage unit 15.

The thus selected repeated call management table c is prepared based on the reason indication values which are defined in the ISDN.

When the call control procedure is implemented to complete a subscriber loop between the source terminal 20 and the PSPDN, the communications network to be handed is switched from the ISDN to the PSPDN.

In FIG. 6, such a switch timing is indicated as a first table switching point.

The call control procedure changing unit 14 detects that event and controls the calling unit 11 in such a way that it changes the ISDN call control procedure to the procedure specified by Recommendation X.25. When the call control procedure determined by the calling unit 11 is thus changed, the repeated call management table selector unit 13 accordingly selects an appropriate repeated call management table, say, table a, from the repeated call management table storage unit 15 to replace table c.

The selected repeated call management table c is prepared based on the cause codes defined in the PSPDN.

Thereafter, the calling unit 11 starts the calling procedure in the PSPDN to complete the connection to the receiver side packet terminal 21.

If a communication trouble occurs while the AU in the PSPDN is called, disconnect information from the ISDN is detected by the disconnect information detecting unit 16. In this instance, the repeated call management table that has been selected by the repeated call management table selector unit 14 is table c, so the repeated calling condition selector unit 12 selects an appropriate repeated call parameter on the basis of this table c and the detected disconnect information.

Similarly, if a communication trouble occurs during calling by the procedure of Recommendation X.25, disconnect information from the PSPDN is detected by the disconnect information detector unit 16. In this instance, the repeated call management table that has been selected by the repeated call management table selector unit 13 is table a, so a repeated call parameter as appropriate for the detected disconnect information is selected by referring to the repeated call management table a.

FIG. 7 is a schematic diagram showing an example of communication procedure in which the above described signal flows are indicated.

In either of the two cases described above, an appropriate repeated call parameter is selected in accordance with the disconnect information of interest and, then, the repeated calling unit 10 determines the call control procedure and communication conditions for repeated calling that comply with the selected call parameter and makes a repeated attempt to call the receiver terminal under the thus determined conditions for repeated calling.

Figure 8:
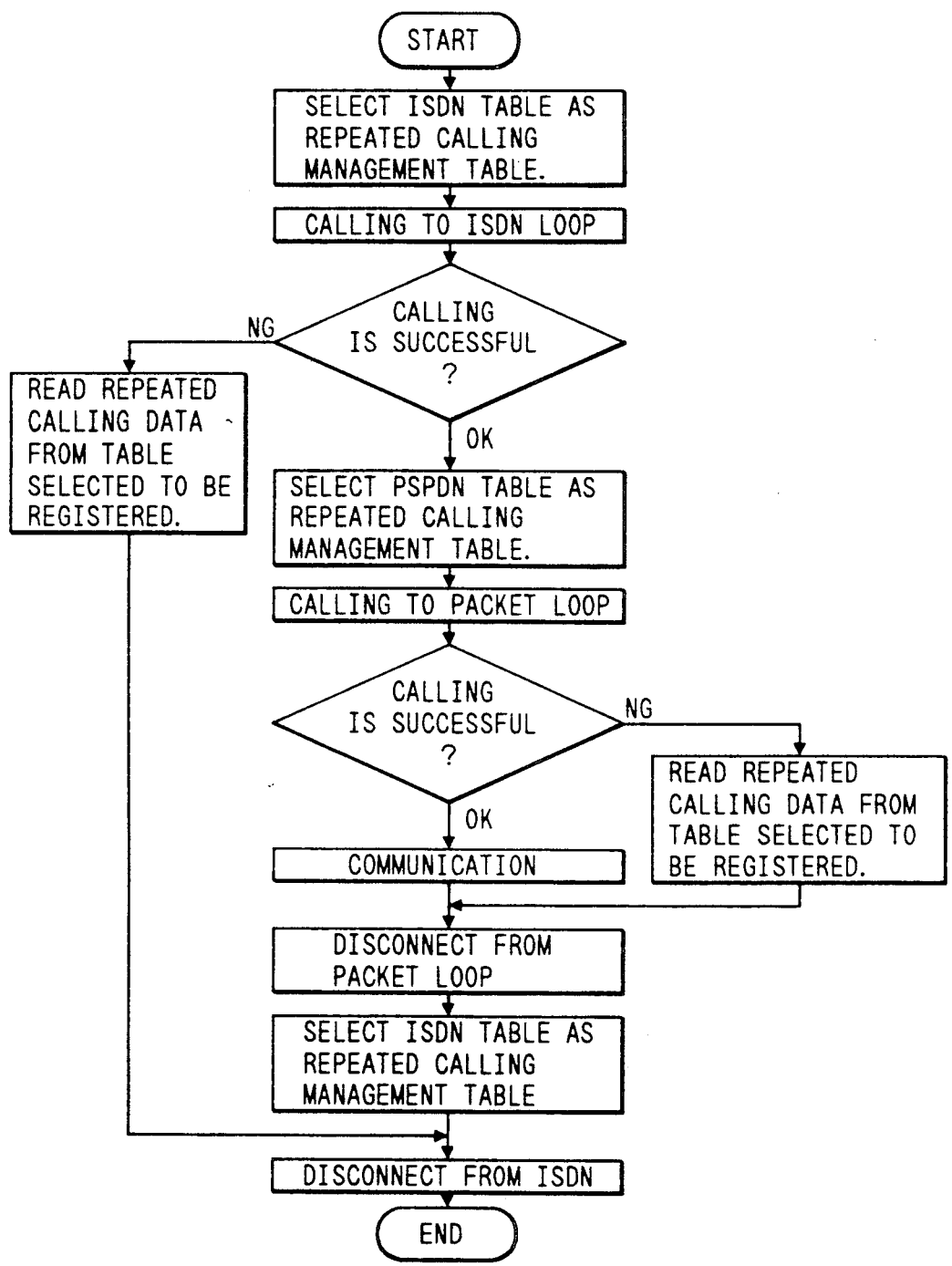
FIG. 8 is a flow chart showing an example of data communication in a communication system according to the present invention.

FIG. 8 is a flow chart of the repeated calling according to the registered codes, which has been described hereinabove.

Figure 4:
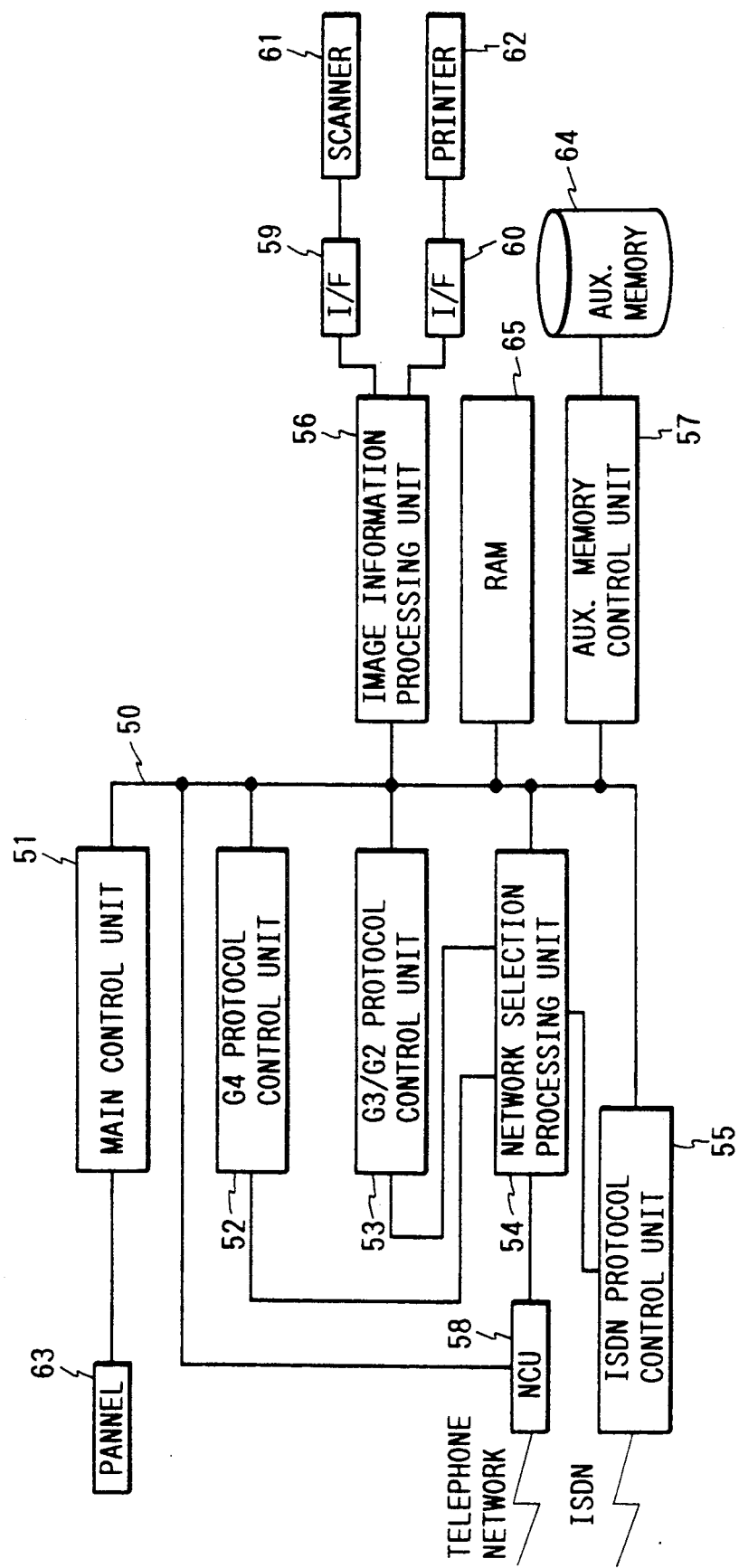
FIG. 4 is a block diagram of facsimile equipment which is an embodiment of the present invention.

FIG. 4 is a block diagram of facsimile equipment which is an embodiment of the present invention. As shown, a bus 50 has the following units connected thereto: a main control unit 51; a G4 protocol control unit 52; a G3/G2 protocol control unit 53; a network selection processing unit 54; an image information processing unit 56; an auxiliary memory control unit 57; a network control unit (NCU) 58; a RAM 65; and an ISDN protocol control unit 55.

An operating panel 63 is connected to the main control unit 51 whereas an auxiliary memory unit 64 is connected to that auxiliary memory control unit 57. A scanner 61 and a printer 62 are connected to the image information processing unit 56 via respective interfaces 59 and 60.

The panel 53 is operated to enter various inputs including conditions of communications such as communication mode (e.g. G3 or G4 mode) and image quality mode (e.g. standard or fine), and the subscriber's number at the receiver terminal.

A plurality of the repeated call management tables described hereinabove are preliminarily registered in RAM 65. The contents of each of those repeated call management tables can be expanded or modified by the operator of the panel 63. By operating the panel 63, the contents of each repeated call management table can be output from the printer 62.

FIG. 5 is a diagram sowing schematically a complex communications network in which an ISDN having the facsimile equipment 40 connected thereto is interconnected with other communication networks which are a telephone network and a PSPDN in the case of the example under consideration. On the pages that follow, the operation of the complex communications network is described for the case where the calling condition of interest is a communication from the facsimile equipment 40 to another facsimile equipment 41 in a G4 mode.

First, the operator operates the panel 63 of facsimile equipment 40 to designate G4 mode as a condition of communications while, at the same time, he sets the calling condition by entering the subscriber's number at the receiver terminal. Then, a communication job that is appropriate for that calling condition is activated in the main control unit 51 which selects the ISDN call control procedure. The term "communication job" unit a program that manages sequence of operations from the start to the end of communication.

When the communication job is activated to start communication control, the main control unit 51 controls the network selection processing unit 54 in such a way that the G4 protocol control unit 52 is connected to the ISDN protocol control unit 55. At the same time, the main control unit 51 reads out of Ram 65 the repeated call management table that is appropriate for the selected ISDN call control procedure.

Subsequently, call control is initiated in accordance with the ISDN call control procedure. Since the receiver terminal is connected to the telephone network communication in G4 mode is impossible and the call is canceled, with disconnect information being sent back to the source terminal.

The returned disconnect information is supplied to the main control unit 51 via the ISDN protocol control unit 55 and the main control unit 51 selects an appropriate repeated call parameter in accordance with the disconnect information and the repeated call management table that has been read out of the RAM 65.

When the communication job is reactivated, the main control unit 51 references the repeated call parameter. Repeated call parameters can be preset in any appropriate manner, so if a parameter indicating "communication in G3 mode" is preliminarily registered as an alternative that is to be selected in the case where communication in G4 mode is impossible, the condition of repeated calling to be made is facsimile communication in G3 mode.

If G3 mode is designated, the main control unit 51 sets the call control procedure for the telephone network and the network selection processing unit 54 connects the G3/G2 protocol control unit 53 to the ISDN protocol control unit 55. Recognizing that the communications network to be handled has been switched to the telephone network, the main control unit 51 reads out of RAM 65 the repeated call management table that is appropriate for the call control procedure of the telephone network.

Now that repeated call control has been initiated in the manner described above, it becomes possible to establish a connection to the telephone network. Thus, communications are performed by the call control procedure of the telephone network and the image information read by the scanner 61 or the image information stored in the auxiliary memory unit 54 is sent out to the facsimile equipment 41.

In the embodiment described above, an appropriate repeated call management table is selected in accordance with the specific communications network being handled, so disconnect information from each communications network can be properly dealt with for permitting a repeated call to be made in a positive manner.

Furthermore, according to the embodiment, the contents of repeated call management tables can be expanded or modified as required, so the conditions for making a repeated call can be easily changed, which contributes to a higher operating efficiency of the system.

As is clear from the foregoing description, the comunication terminal equipment of the present invention selects an appropriate repeated call management table in accordance with the specific communications network being handled and determines the proper conditions for making a repeated call on the basis of the selected repeated call management able and the disconnect information sent from the particular communications network. As a result, a repeated call can be made in a positive way even in a complex communications network consisting of many mutually interconnected networks.

What is claimed is:

1. Communication terminal equipment which is connected to an ISDN (integrated services digital network) to perform two-way communications with terminal equipment on a complex communications network having an ISDN interconnected with existing communication networks, comprising:
   a calling means for calling a receiver terminal according to a call control procedure and under the condition of communications that comply with a specific calling condition;
   a call control procedure changing means for changing the call control procedure upon detecting a switch from one communications network to another to be handled;
   a disconnect information detecting means for detecting the disconnect information being sent back when a communication trouble has occurred;
   a repeated call management table storage means for registering a plurality of repeated call management tables each specifying the relationship between disconnect information and the condition of making a repeated call;
   a repeated call management table selecting means by which a repeated call management table that complies with said control procedure is selected from said repeated call management table storage means;
   a repeated calling condition selector means by which an appropriate condition for making the repeated call is selected from said selected repeated call management table on the basis of the returned disconnect information; and
   a repeated calling means for calling again the receiver terminal of interest by the call control procedure and under the condition of communications that comply with the selected condition for making the repeated call.

2. The communication terminal equipment according to claim 1 further comprising: means for modifying the contents of one or more of said repeated call management tables.

* * * * *